(12) United States Patent
Dainys (10) Patent No.: US 7,410,121 B2
(45) Date of Patent: Aug. 12, 2008

(54) MAN-POWERED ORNITHOPTER-SAILPLANE

(75) Inventor: Remigijus Dainys, Rinktines g. 47-64, Vilnius (LT) 09206

(73) Assignees: Remigijus Dainys, Vilnius (LT); Daiva Laureniene, Vilnius (LT); Jurandas Laurenas, Vilnius (LT)

( * ) Notice: Subject to any disclaimer, the term of this patent is extended or adjusted under 35 U.S.C. 154(b) by 330 days.

(21) Appl. No.: 10/571,399

(22) PCT Filed: May 31, 2004

(86) PCT No.: PCT/LT2004/000002

§ 371 (c)(1),
(2), (4) Date: Mar. 10, 2006

(87) PCT Pub. No.: WO2005/023647

PCT Pub. Date: Mar. 17, 2005

(65) Prior Publication Data

US 2007/0029441 A1    Feb. 8, 2007

(30) Foreign Application Priority Data

Sep. 11, 2003    (LT) .................................. 2003 081

(51) Int. Cl.
*B64C 33/00* (2006.01)
(52) U.S. Cl. ........................... 244/11; 244/4 A; 244/72; 244/22
(58) Field of Classification Search .................. 244/11, 244/4 A, 72, 22
See application file for complete search history.

(56) References Cited

U.S. PATENT DOCUMENTS

| | | | | |
|---|---|---|---|---|
| 797,154 | A | * | 8/1905 | Spies ........................... 244/72 |
| 1,506,624 | A | * | 8/1924 | Forchione .................... 244/11 |
| 4,053,122 | A | * | 10/1977 | Gar ............................. 244/11 |
| 4,417,707 | A | * | 11/1983 | Leong ......................... 244/11 |
| 5,170,965 | A | * | 12/1992 | Yasuda ........................ 244/64 |

* cited by examiner

*Primary Examiner*—Jacob Y. Choi
*Assistant Examiner*—Michael Kreiner
(74) *Attorney, Agent, or Firm*—Dennis G. LaPointe (57) ABSTRACT

A man-powered ornithopter-sailplane, which has one or two pair of flapping wings and a hang-glider wing wherein substantially novel femoral and humeral muscular propulsion engines with the aid of which the body members connected thereto form integrated moving-flying and controlling-guiding mechanisms. Femoral arms are fixed to the torso base from which the movements for the wings flapping with respect to axles inclined to a horizontal direction are transmitted through the intermediate links of a kinematic chain. The wings comprise a row of rotational rods arranged therein and provided with elastic feather-like panels which produced during flapping, in a closed or turned position thereof, aerodynamic profiles and corresponding lifting and propulsion aerodynamic forces. The controlling-guiding movements are transmitted from the humeral arms to the flapping wings using movable ball joints. The diversity of movements of the femoral arms, humeral arms, hang-glider wing make it possible to control the flight.

7 Claims, 9 Drawing Sheets

MAN-POWERED ORNITHOPTER-SAILPLANE

RELATED APPLICATION

This application is a national stage application based on PCT/LT2004/000002 filed on Mar. 31, 2004, which claims priority from Lithuania application 2003 081 filed Sep. 11, 2003.

FIELD OF THE INVENTION

The invention relates to man-powered flying devices.

BACKGROUND OF THE INVENTION

A sailplane-ornithopter, which has two pairs of flapping wings, links, cables, interconnected rods, and loops is known (USSR patent no. 1205, 64 C 33/02). A man-powered flying device with two flapping wings, and two different variants of stands and arms pedals, and links is known (M. K. Tichonov Полет птиц и машин с машущими крыльями Moscow. 1949, pp. 168).

A motorised ornithopter with flapping wings with feather-shaped panels, where a mechanism automatically controls the rotation of its rods to the necessary angle, is known (USSR, certificate of authorship no. 187 533). A flying apparatus with inclined horizontal wing axes, two flapping wings consisting of a wing panel with a solid part and a second part consisting of panels-flaps mounted on rotatable rods, is known (French patent no. 2 171 946). A serious deficiency of the flapping wings of these flying devices is their imperfect aerodynamic profiles: the movement of the rods during the wings' rising-upbeat cycle creates a negative aerodynamic force directed downward. Thus these apparatuses cannot fly at slow speeds.

SUMMARY OF THE INVENTION

The purpose of this invention is to increase in every way the possibilities of a human pilot to make the most effective use of the power from all the strongest muscle groups: thighs, torso, shoulders, and arms, which would allow him to selectively fly in turns by flapping his wings or gliding, smoothly descend, manoeuvre easily, and steer it during such a flight with effective propulsion and guiding mechanisms adapted for this.

The specified aim is achieved by using two muscular propulsion engines: a femoral propulsion engine and a humeral propulsion engine in accordance with USSR invention certificate of authorship no. 945 491 of R. Dainys, the creator of this invention, and in accordance with international publication WO 03/035186 of an invention of R. Dainys. The invention of a muscular propulsion ornithopter-sailplane is intended to create an opportunity for a human pilot to use only the power of his own muscles to take off, fly by flapping his wings or gliding, manoeuvre freely, make various turns, and gradually or abruptly descend by reducing the speed of the descent and the flying speed and by reducing them to practically zero at the moment of landing. Such flying and gliding possibilities can be created by using both the first and the second variant of the muscular propulsion ornithopter-sailplane characterised by fundamental new features so that thanks to femoral and humeral propulsion engines the principal parts of the person's body which are joined and securely attached to them: the torso, thighs, shoulders, upper arms, and arms become a single integrated propelled-steered mechanism for flight. According to the first variant, the ornithopter-sailplane has one pair of flapping wings and a hang glider wing. According to the second variant, the ornithopter-sailplane has two pairs of flapping wings and a hang glider wing. The delta shaped-hang glider wing is used in this invention only as a well-mastered flying apparatus, although any other construction having markedly better aerodynamic profile parameters than a delta-shaped wing, could be much more effectively used in its place.

The fundamental originality Consists of the use a femoral propulsion engine in the flapping mechanism. To the femoral engine's torso base is attached a frame, to which is attached the posterior ball joints of inclined horizontal wing axles. The mobile anterior ball joints of the flapping wing axles are connected through intermediate links and intermediate ball joints to the humeral engine's humeral arms, which are attached by straps to one another, to the upper arms, and the shoulder base, which is joined to the torso base by a sliding ball joint. The kinematic chain of the flapping mechanism consists of femoral arms attached to the torso base, which arms are connected to the flapping wings through intermediate joints, intermediate links, and the wing arms.

The fundamentally original flapping wings have wing panels with rotatable stiff rods, to which are attached, asymmetrically to the rods' axes, stiff feather-like panels, which narrow at the ends and create a broken aerodynamic profile at the end of the wing with intervals between the adjacent feather-like panels and a solid aerodynamic profile in the middle of the wing when gliding or during the downward flapping movement of the wing. This profile creates increased lift and propulsion aerodynamic forces, which are created by the strong air whirls and flows created in the intervals between these panels due to the lengthwise and rotated deformations of the rods and due to bending deformations of the posterior edges of the feather-like panels. This wing construction during the period of its movement upwards and backwards forces the feather-like panels to rotate and changes them into a broken wing consisting of a row of rotated feather-like panels creating not only lifting but also forward propulsion forces. This effective action of the flapping wings is very important in the initial period of the ornithopter's ascent, which can create possibilities for the pilot to rise vertically or by flapping the wings to briefly hover by staying at one height.

The construction of the first variant of the ornithopter-sailpiane creates essentially new possibilities to perform such guiding-steering movements. The direct kinematic connection between the femoral arms and the wings allows the pilot to set one or both wings in positions with different angles by fixing the thighs in corresponding positions, by the thighs moving at different speeds, or by letting them lag according to the phases of the flapping cycle when each change in the angle of the declination of the flapping wings simultaneously changes the balance of the aerodynamic forces of these wings and creates possibilities for the pilot to make turns with just the uneven movements of the thighs.

Very diverse, essentially new guiding-steering movements can be performed by using the humeral engine by leaning the torso forward, backwards, and/or to the sides, rotating the shoulders about the lengthwise axis of the spine in different directions, or by making all the same movements while moving just the shoulders and upper arms. All of these steering movements are transmitted from the humeral arms to the mobile anterior joints of the wing axles through a direct kinematic chain of intermediate links and joints. By rotating the humeral arms backwards, the wings are rotated backwards, their angle of attack is increased, and the wings rise upwards and vice versa, by rotating the arms forward, the aerodynamic forces of the wings are reduced and the wings descend. By rotating one shoulder forwards or backwards or by rotating the shoulders in different directions, the wings move in opposite directions and therefore the ornithopter's tail end makes turns and banks. All of these ascending, descending, and banking steering-guiding movements can be made synchronically in co-ordination with the femoral steering-guiding movements. Furthermore, all of the guiding movements of the flapping wings that are described here can be made simultaneously in co-ordination with various steering movements of the hang glider wing and made during any ascent, active flapping flight, gliding, and descent. Therefore these great possibilities for a variety of guiding movements and their derivatives allow a pilot to perform completely analogous guiding movements such as agile flying birds make. Furthermore, by descending vertically like a parachute, otherwise called a 'parachuting' regime, it is even possible to descend in a backwards direction or descend while rotating about a vertical axis like a whirligig.

According to the second variant, an ornithopter-sailpiane characterised by other essentially novel features can be created with a hang glider wing and two pairs, anterior and posterior, of flapping wings. Likewise in this variant, the femoral engine is used to perform various propulsion-flapping movements. In this case, the posterior ball joints of the axles for the anterior flapping wings and the anterior ball joints of the axles for the posterior flapping wings are attached in an immobile manner to the frame attached to the femoral engine's torso base. In this case, it is novel that in the direct kinematic chain the left femoral arm is joined to the anterior pair of flapping wings and the right femoral arm to the posterior pair of flapping wings. The guiding kinematic chain consists of intermediate links, arms, and joints that join the humeral arms to the anterior mobile ball joints of the anterior pair of wings and through additional arms and joints, to the posterior mobile ball joints of the posterior pair of wings. A pilot can perform flapping propulsion movements by moving his thighs simultaneously and also performing simultaneous upwards-backwards and downwards-forwards movements of both pairs of wings. But the essential difference in this case is that the pilot can simultaneously move his thighs in opposite directions just like a person running on the ground does. The essential novelty in this case is that the anterior and posterior pairs of wings move in opposite directions, one downwards, the other upwards, and can therefore create very uniform aerodynamic forces. In this variant the guiding movements are performed by fixing the flapping wings in various positions and creating different aerodynamic forces with them. The guiding-steering movements with the humeral engine are made in the same way as in the first variant by moving the humeral arms in a great diversity of ways and by alternating the angle of attack of the flapping wings. The essentially new difference and new possibilities in this case arise in the parachuting-descending regime where the parachuting-descending regime is created by using only the hang glider wing and posterior pair of flapping wings. In this case a possibility arises to regulate or reduce the speed of descent by slow flapping movements of the anterior pair of wings. In the second variant there are more favourable possibilities to perform vertical ascents or to maintain a longer hovering regime at one height by moving the thighs in opposite directions during a 'running' regime since during this period the aerodynamic forces created by both pairs of flapping wings even out.

BRIEF DESCRIPTION OF THE DRAWINGS

The essence of the invention is explained in the drawings, in which.

DETAILED DESCRIPTION OF THE INVENTION

A man-powered ornithopter-sailplane according to the first variant with femoral and humeral propulsion engines in accordance with USSR certificate of authorship no. 945 941 and in accordance with international invention publication WO 03/035 186 having torso base 1, torso strap 2, two femoral arms 3 with thigh straps 4, two axles 5 joining torso base 1 to femoral arms 3. Torso base I is connected in the front by sliding ball or cardan joint 6 to shoulder base 7 in front of it. To the edges of torso base 1 are attached the frame's left and right framework, which consists of strip pairs 8, 9, 10. The strip pairs 9, 10 converge in the front, are joined together, and are attached to ball or cardan joint 11. Created from strip pairs 8, 10, the frame's posterior corners are connected by strip 12. The left 15 and right 16 ball joints of the left 13 and right 14 wing axles of the flapping wings are rigidly attached respectively to the left and right corners created by strips 8, 10. Wing axles 13, 14 are rotated horizontally and the angle of that rotation can be variously and easily changed by guiding-steering movements. The mobile anterior left 17 and right 18 ball joints of wing axles 13, 14 are joined respectively through intermediate left 19 and right 20 links to the left 21 and right 22 ball joints, which are attached to the left 23 and right 24 humeral arms respectively. Humeral arms 23, 24 are attached in front to each other by strap 25, in back to shoulder base 7 by left and right straps 26 and 27, and to the upper arms by left 28 and right 29 upper arm straps respectively. Wing axles 13, 14 have rigidly attached left 30 and right 31 brackets creating an extension of axles 13, 14 beyond immobile ball joints 15, 16. The ends of brackets 30, 31 are joined to one another by tightly stretched posterior cord 32, which acts like a counterbalance to tightly stretched anterior cord 33 between mobile anterior ball joints 17, 18. This counterbalance between stretched cords 32, 33 guarantees the maintenance of a uniform distance between mobile anterior ball joints 17, 18 when performing all the guiding movements of the flapping wings with humeral arms 23, 24. To femoral arms 3 are attached respectively the left 34 and right 35 ball joints, which are joined through left and right intermediate links 36, 37 to left and right ball joints 38, 39, which are attached to left and right moving wing arms 40, 41, which are rigidly attached to wing axles 13, 14.

Figure 1:
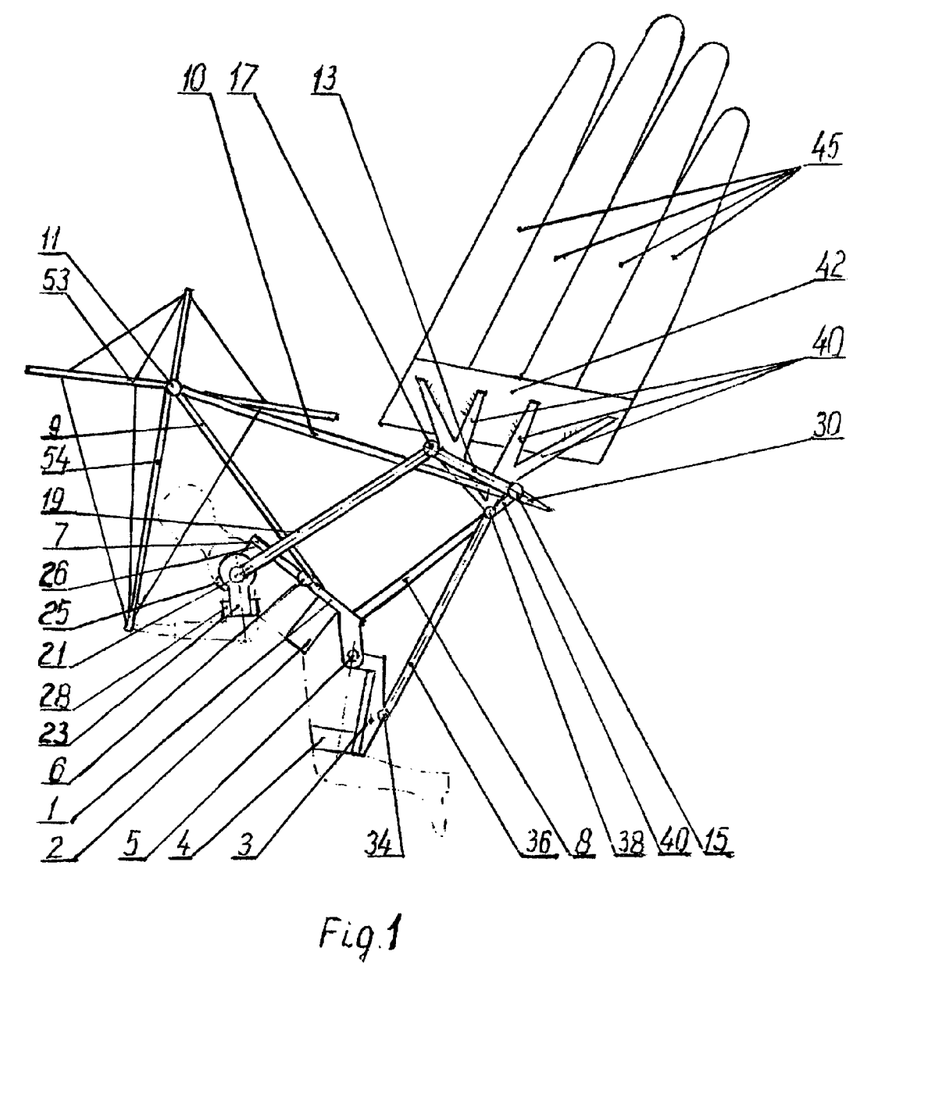
FIG. 1 depicts a side view of the first variant of the man-powered ornithopter-sailplane with one pair of flapping wings and a hang glider wing.
Figure 2:
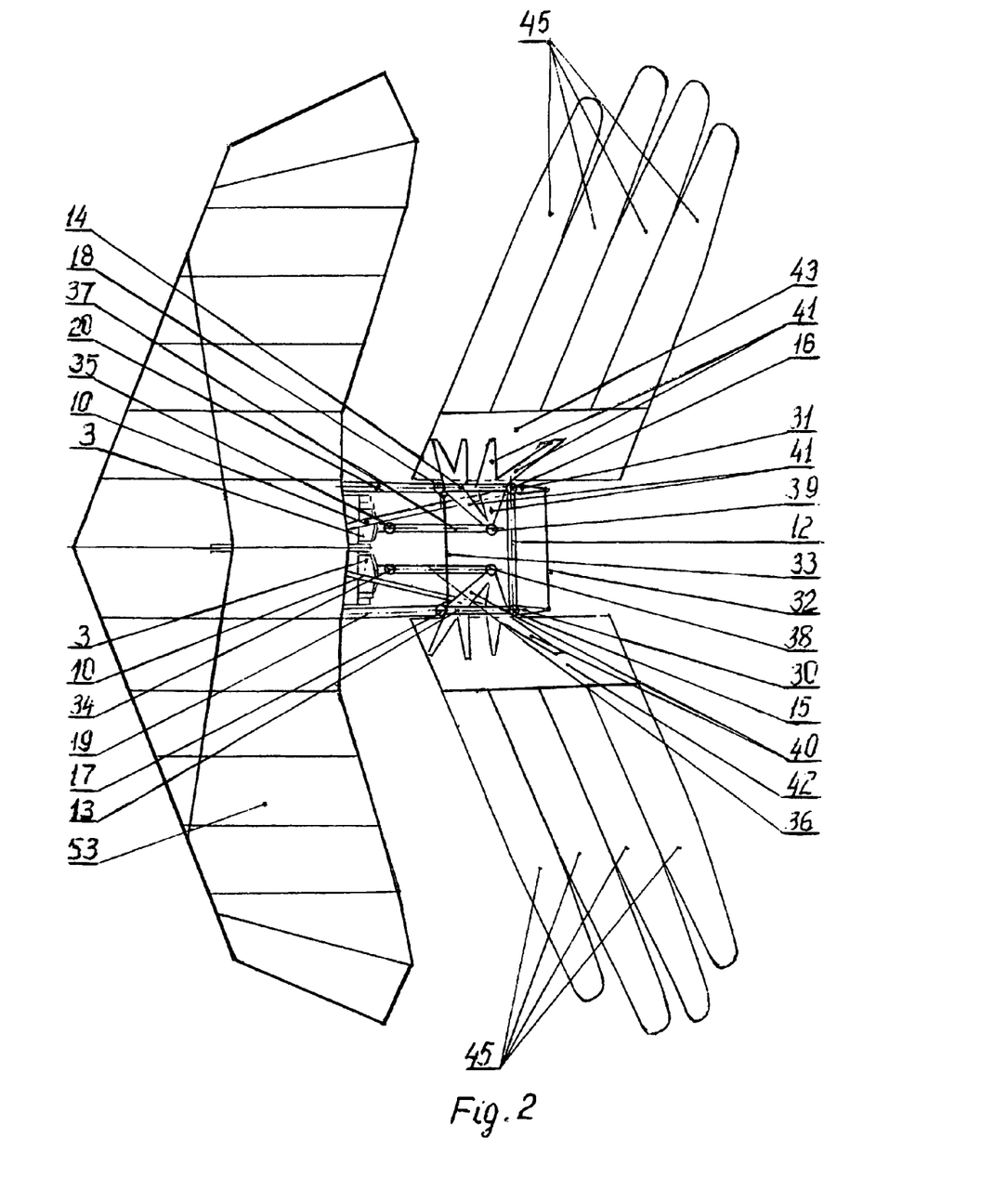
FIG. 2 depicts a top view of the same first variant in FIG. 1.
Figure 3:
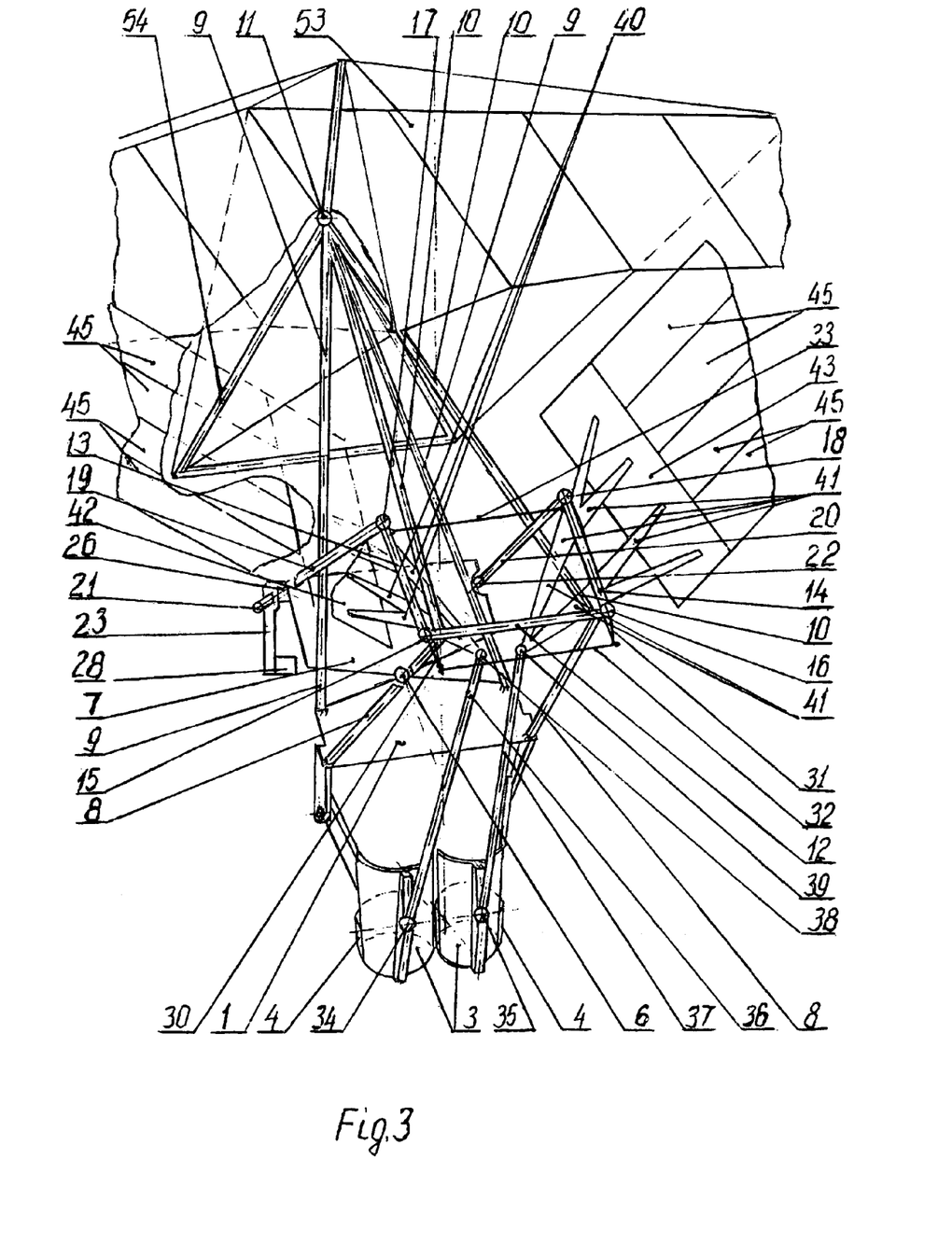
FIG. 3 depicts an axonometric view of the central part of the same first variant.
Figure 4:
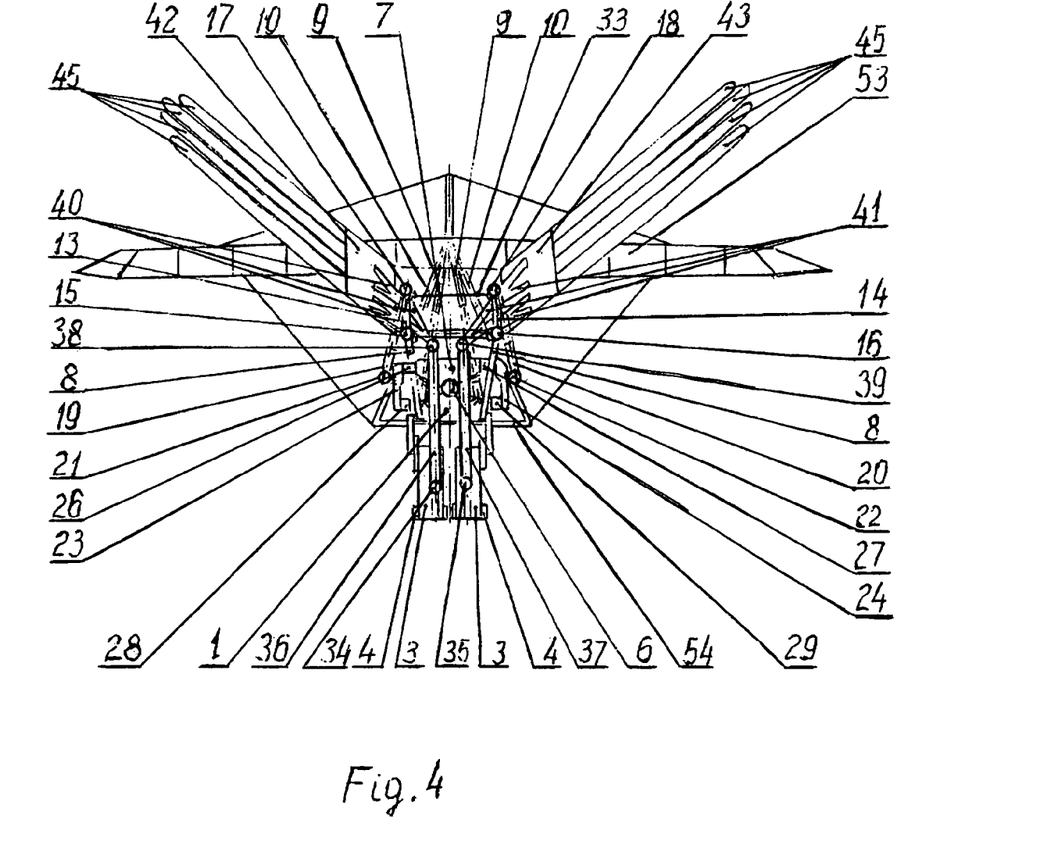
FIG. 4 depicts a rear view of the same first variant in FIG. 1.
Figure 5:
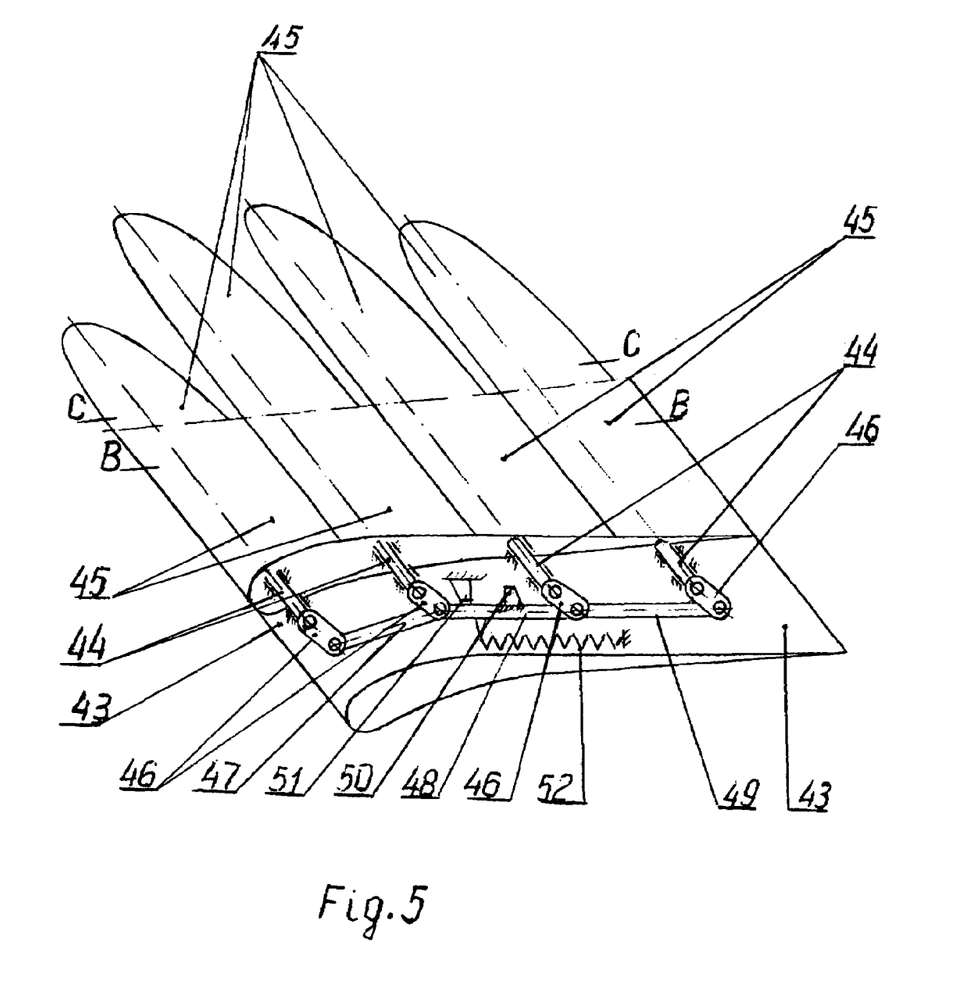
FIG. 5 depicts part of a flapping wing.
Figure 6:
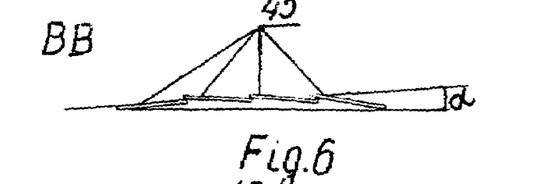
FIG. 6 depicts cross section BB of the flapping wing from FIG. 5.

Wing arms 40, 41 are rigidly attached respectively to the left 42 and right 43 flapping wing panels. In the variant depicted in FIG. 5, in the middle of wing panels 42, 43 are mounted four stiff rotatable rods 44, to the external ends of which are attached, asymmetrically to their axes, four stiff feather-like panel 45 with an aerodynamic profile. The axes of the bend in rods 44 are mounted so that in the middle part of the wing, in a cross section according to BB (FIG. 6) the feather-like panel 45 lie snug against one another and form the wing's general aerodynamic profile and in the end part of the wing, in a cross section according to CC (FIG. 7), they form an analogous aerodynamic profile but have narrowing intervals between the adjacent feather-like panel 45. In the middle of wing panels 42, 43 is a mechanism for uniformly rotating the rods, which is made from cranks 46, which are mounted on rotatable rods 44 and interconnected by parallel links 47, 48, 49. To link 48 is attached support 50, which limits the angle of rotation of rods 44 by resting on support 51, which is attached to the immobile construction of the wing panels and to which is also attached spring 52, the other end of which is attached to link 48. Spring 52 returns links 47, 48, 49 and rods 44 to their initial position after their rotation and at the same time ensures the rotation of feather-like panels 45 to the shut position.

In both the first and the second variant of the ornithopter-sailplane with one or two pairs of flapping wings, hang glider wing 53 and guiding trapezium 54 are attached to a ball joint 11 at the front of the frame.

Figure 12:
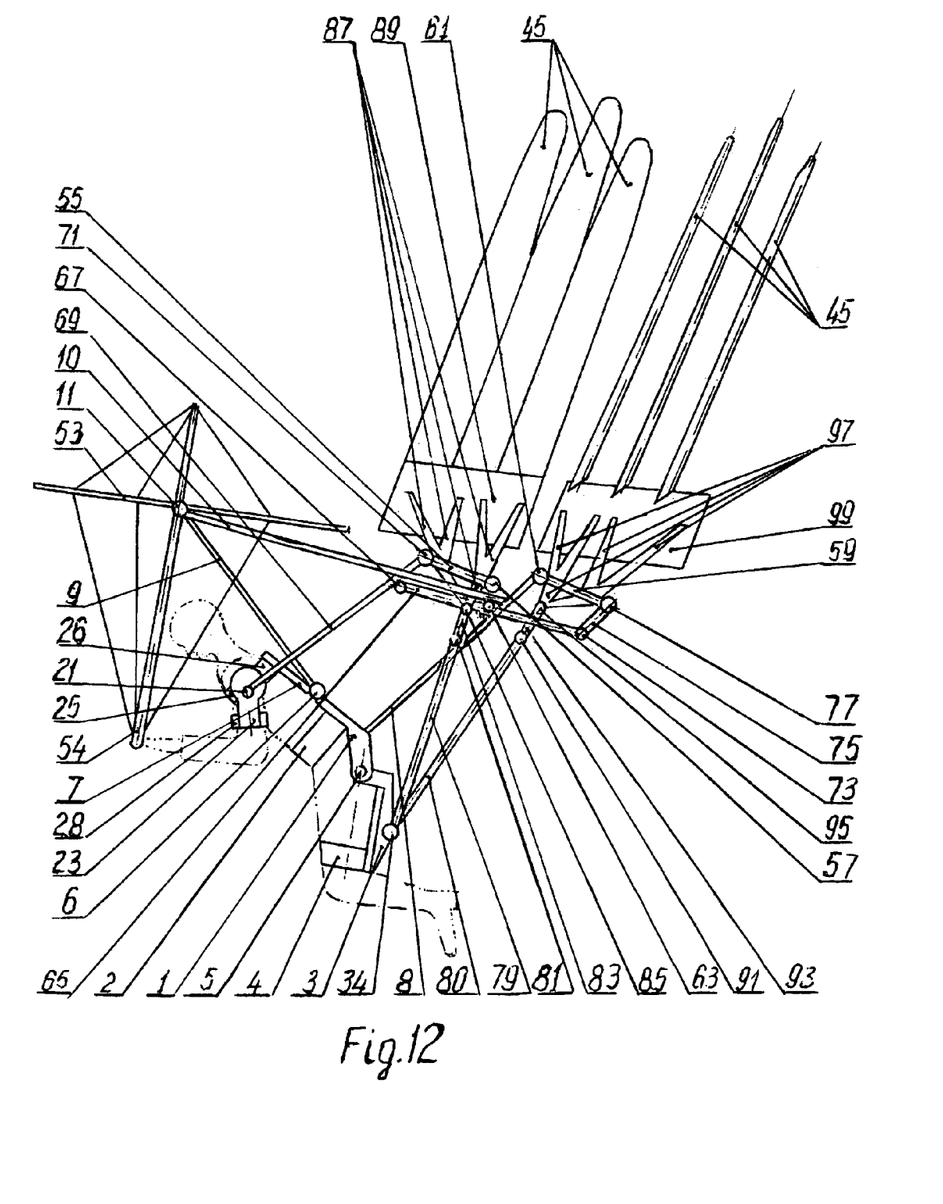
FIG. 12 depicts a side view of the second variant of the man-powered ornithopter-sailplane with two pairs of flapping wings and a hang glider wing and depicts the feather-like panels of the posterior pair of flapping wings in a rotated position like in FIG. 8 and FIG. 9.
Figure 13:
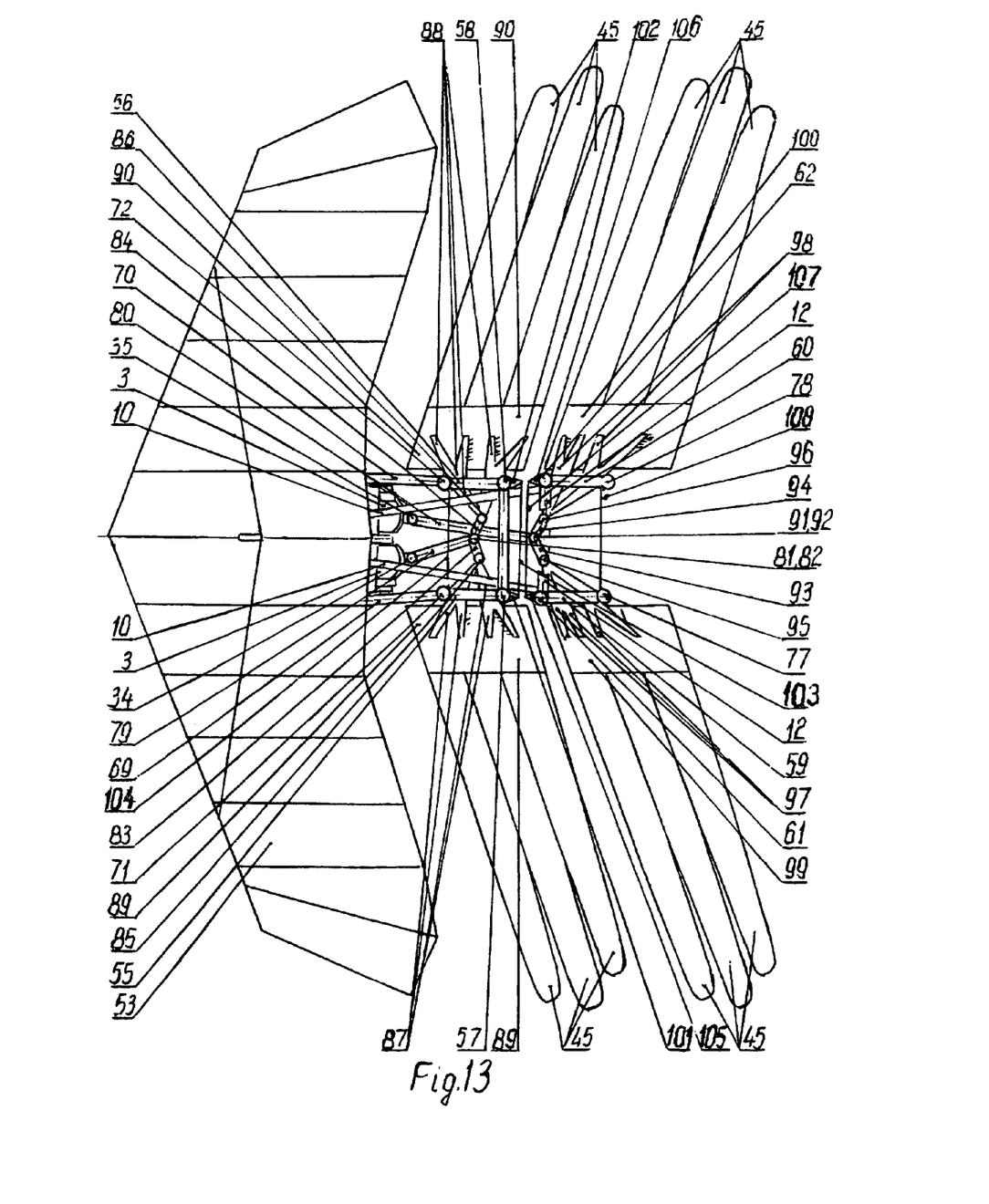
FIG. 13 depicts a top view of the second variant of the man-powered ornithopter-sailplane in FIG. 12.
Figure 14:
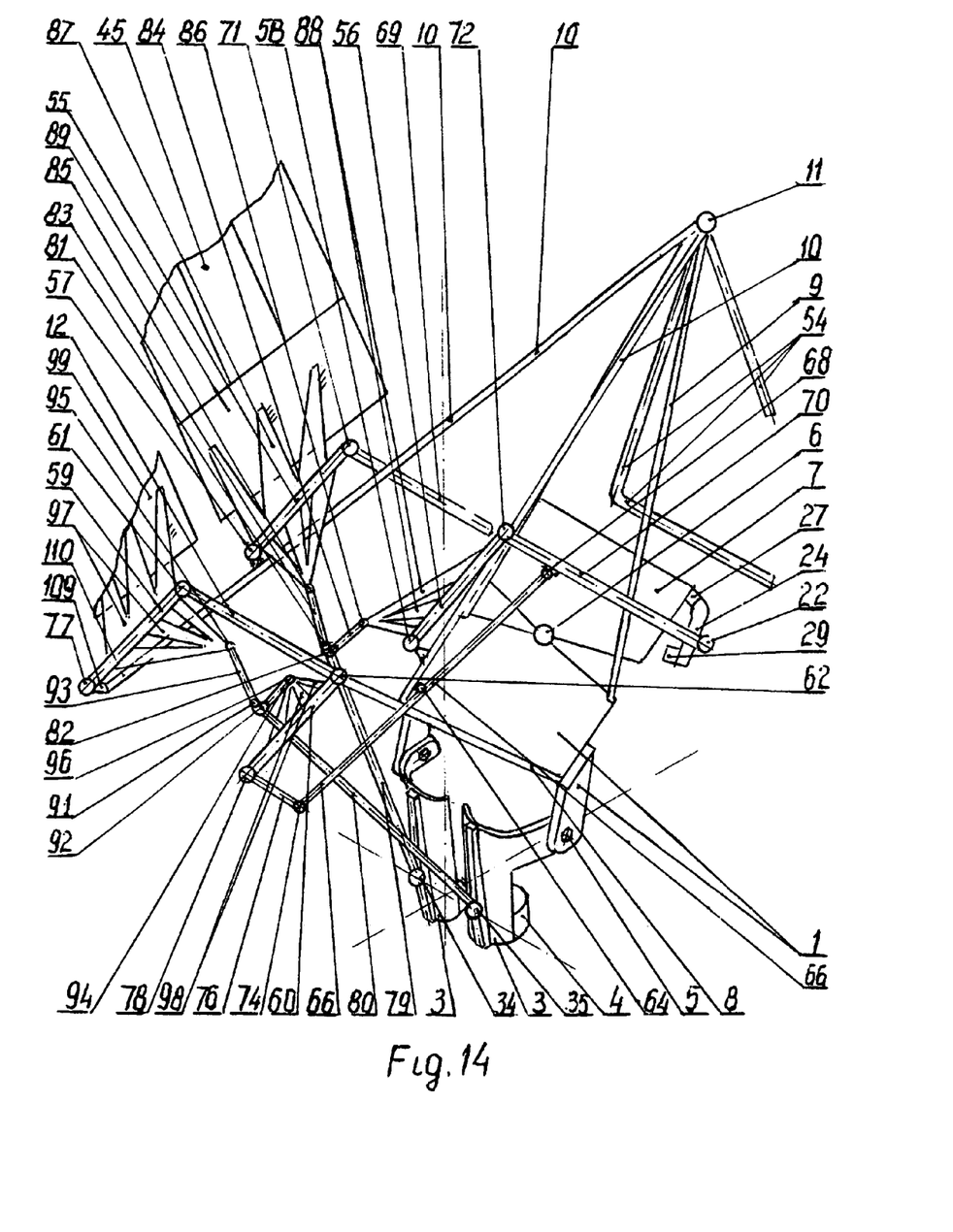
FIG. 14 depicts the construction of the immobile attachment of the frame to the ball joints of the posterior pair of flapping wings that partially replaces part of the second variant of the ornithopter-sailplane in FIG. 12.

A man-powered ornithopter-sailplane according to the second variant with a hang glider wing and two pairs of flapping wings and with femoral and humeral propulsion engines in accordance with USSR certificate of authorship no. 945 941 and international invention publication WO 03/035 186, has torso base 1, torso strap 2, two femoral arms 3 with thigh straps 4, and two axles 5 joining the torso base to femoral arms 3. Torso base 1 is connected in front by sliding ball or cardan joint 6 to shoulder base 7. To the sides of the torso base are attached the frame's left and right framework, which consists of strip pairs 8, 9, 10. Strip pairs 9, 10 converge in front, are joined together, and are attached to ball or cardan joint 11. Created from strip pairs 8, 10, the frame's posterior corners have an extension consisting of strip 8 and are attached to one another by strip 12. According to the first design of the second variant, to strips 10 are rigidly attached left and right posterior ball joints 57, 58 of left and right axles 55, 56 of the anterior left and right wings and to the frame's posterior corners are rigidly attached anterior left and right ball joints 61, 62 of axles 59, 60 of the posterior left and right flapping wings. To strips 10 are attached in a sliding manner left and right ball joints 63, 64, which are connected to left and right links 65, 66, in front of which are left and right joints 67, 68, which are joined respectively to left and right links 69, 70, which are connected on top to anterior mobile left and right ball joints 71, 72 of axles 55, 56 of the anterior pair of wings. The inferior ends of links 69, 70 are connected to left and right ball joints 21, 22, which are connected to left and right humeral arms 23, 24, which are attached to themselves in front by strong strap 25, in back by straps 26, 27 to shoulder base 7, and at the other end to the upper arm by upper arm straps 28, 29. Left and right links 65, 66 at the posterior end are connected to left and right ball joints 73, 74, which are connected through left and right intermediate links 75, 76 respectively to left and right mobile joints 77, 78 of axles 59, 60 respectively of the posterior pair of wings. Femoral arms 3 through left and right ball joints 34, 35 are connected to left and right links 79, 80. Left link 79 through intermediate joints 81, 82 is connected to left and right intermediate links 83, 84, which through ball joints 85, 86 are connected to left and right anterior wing arms 87, 88, which are rigidly attached to axles 55, 56 of the anterior wings. Wing arms 87, 88 are rigidly attached to anterior left and right flapping wing panels 89, 90, in which, like in the first omthopter variant, are mounted rotatable rods 44 and to these are attached feather-like panels 45 and mounted an analogous mechanism for the uniform rotation of the rods. Right link 80 through intermediate joints 91, 92 is connected to left and right intermediate links 93, 94, which through ball joints 95, 96 are connected to posterior flapping wing arms 97, 98, which are rigidly attached to posterior wing axles 59, 60. Wing arms 97, 98 are rigidly attached to posterior flapping wing panels 99, 100, which, like the anterior wings, have rotatable rods 44, feather-like panels 45, and a mechanism to uniformly rotate the rods. Left and right axles 55, 56 for the anterior wings have extensions: left and right brackets 101, 102, the ends of which are joined by stretched cord 103 and the stretched counterbalance to it consists of cord 104 stretched between axles 55, 56 at anterior mobile joints 71, 72. Similarly axles 59, 60 of the posterior wings have extensions in front: left and right brackets 105, 106, the ends of which are joined by stretched cord 107 and the stretched counterbalance to it consists of cord 108 stretched between axles 59, 60 at posterior mobile joints 77, 78. According to the second design of the second variant of the ornithopter-sailplane with two pairs of flapping wings, posterior ball joints 77, 78 of posterior wing axles 59, 60 are rigidly attached to strip 109, which is rigidly attached to extension 110 of strip 10 of the frame.

In the case of the first variant of the ornithopter-sailplane, when flying the pilot makes the propulsion-flapping movements gradually and simultaneously by moving his thighs-femoral arms 3 and makes propulsion steering movements by moving his shoulders and humeral arms 23, 24. The pilot can also make guiding steering movements by-diversely and unevenly moving femoral arms 3, moving one femoral arm, or slowing or completely stopping one or the other femoral arm 3. In this case the different position of the wings' declination angles directs the joint aerodynamic force of the wings to the side with the wing that is less tilted.

The movements of femoral arms 3 are transmitted to wing panels 42, 43 through ball joints 34, 35, intermediate links 36, 37, ball joints 38, 39, and wing arms 40, 41. By bringing up the thighs, the wing rises upwards and backwards and by stretching them out, the wings descend downwards and forwards.

The pilot can make guiding-steering movements with flapping wings by moving just his upper arms and shoulders, bending or twisting the upper part of his torso, or by making all these movements simultaneously, for example, those of the upper arm and torso. All of these movements are transmitted from humeral arms 23, 24 to wing panels 42, 43 through joints 21, 22, intermediate links 19, 20, mobile joints 17, 18, and wing axles 13, 14. Humeral arms 23, 24 can be moved forwards and backwards simultaneously or in opposite directions, i.e. one forwards, the other backwards, or only one of them moved with the other remaining in a fixed position. The backwards movements of humeral arms 23, 24 increase a flapping wing's angle of attack α (See FIG. 6, 7.) and at the same time the increased vertical lifting aerodynamic force of each wing lifts the wing upwards. The downwards movements of humeral arms 23, 24 reduce the wings' angle of attack a and the aerodynamic force and the wings descends.

The pilot can make additional and very varied movements for guiding the flight with guiding trapezium 54 and by changing the declination angles of hang glider wing 53. All the very diverse hang glider wing guiding movements, which are now used, hang glider pilots can very broadly use in guiding the ornithopter-sailplane.

In the second variant of the ornithopter-sailplane, the movements of left femoral arm 3 are transmitted to wing panels 89, 90 through joint 34, intermediate link 79, intermediate joints 81, 82, intermediate links 83, 84, ball joints 85, 86, and anterior wing arms 87, 88. Similarly the movements of right femoral arm 3 are transmitted to wing panels 99, 100 through joint 35, intermediate link 20, intermediate joints 91, 92, intermediate links 93, 94, ball joints 95, 96, and posterior wing arms 97, 98. By drawing up both thighs, both pairs of wings rise upwards and backwards and by extending the thighs, descend downwards and forwards. The pilot can make guiding movements by just using the thighs to fix a different angled position of the thighs and both pairs of flapping wings or by moving the thighs and pairs of wings at different speeds, or when the movements of one thigh and pair of wings lag behind the others during the periods of their movement cycle.

In the second variant of the ornithopter-sailplane, the guiding-steering movements are transmitted from humeral arms 23, 24 to anterior wing panels 89, 90 through joints 25, 26, intermediate links 69, 70, mobile joints 71, 72, and wing axles 55, 56 and are transmitted to posterior wing panels 99, 100 through intermediate links 69, 70, joints 67, 68, links 65, 66, joints 73, 74, intermediate links 75, 76, posterior mobile joints 77, 78, and posterior wing axles 59, 60. Movements by the upper arms and humeral arms 23, 24 are made in various ways directly for mobile anterior joints 71, 72 of the anterior wings and for the mobile posterior joints 77, 78 of the posterior wings. Backwards movements of humeral arms 23, 24 raise mobile joints 71, 72 and simultaneously lower mobile joints 77, 78 of the posterior wings. In this way they simultaneously increase the angle of attack α of the anterior wings and the posterior wings (See FIGS. 6, 7.) and at the same time increase the aerodynamic lifting forces of both pairs of wings, both pairs of wings lifting the ornithopter upwards. On the contrary, forward movements of humeral arms 23, 24 reduce the posterior wings' angle of attack a and after thus reducing the aerodynamic forces, the ornithopter descends. If backwards or forwards movements are made with only left or right humeral arm 23 or 24, they correspondingly increase or decrease the angle of attack a of the left or right wings being controlled and thus the joint effect of the aerodynamic forces of both pairs of wings causes the ornithopter to make turns and banks.

According to the second design of the second variant, of the ornithopter-sailplane (See this variant of the frame's left framework in FIG. 14.), it is possible to control only the anterior pair of flapping wings with humeral arms 23, 24.

In the second variant, a pilot can steer hang glider wing 53 by rotating trapezium 54. A pilot can use the steering trapezium as an arm brace to push or pull himself to it while using the muscle power of both arms when making steering movements with humeral arms 23, 24.

Figure 7:
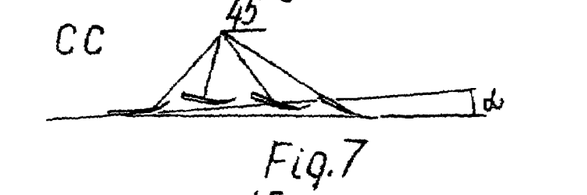
FIG. 7 depicts cross section CC of the flapping wing from FIG. 5.
Figure 8:
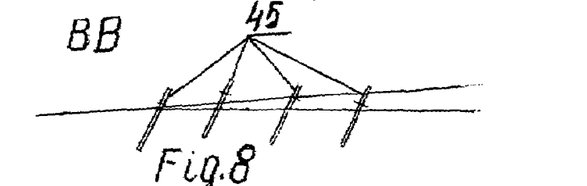
FIG. 8 depicts cross section BB from FIG. 5 with rotatable feather-like panels when the horizontal flying speed $V_H$ equals 0.
Figure 9:
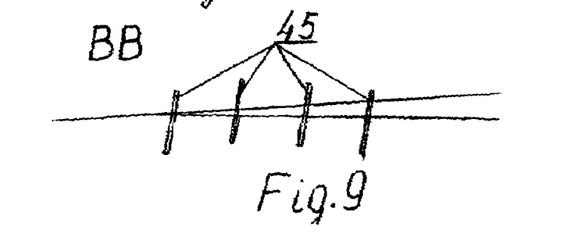
FIG. 9 depicts cross section BB from FIG. 5 with rotatable feather-like panels when the horizontal flying speed is $V_H$.
Figure 10:
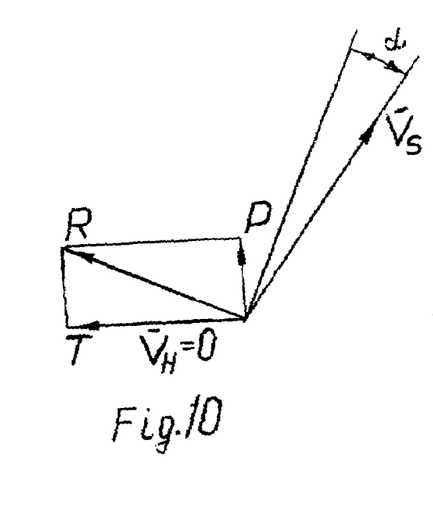
FIG. 10 depicts the aerodynamic forces and the speeds of the feather-like panels of a wing moving upwards and backwards in the case depicted in FIG. 8 where the flying speed is zero.
Figure 11:
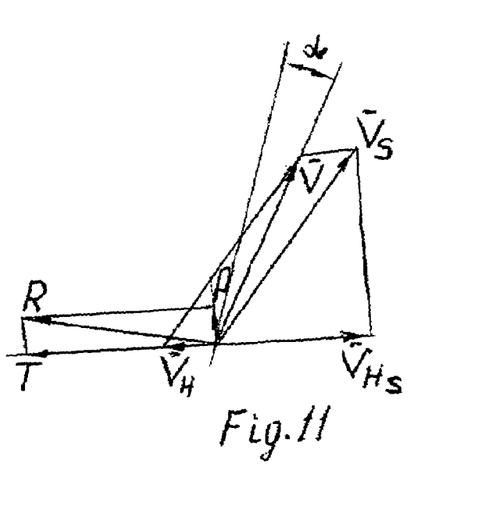
FIG. 11 depicts the aerodynamic forces and the speeds of the feather-like panels of a wing moving upwards and backwards in the case depicted in FIG. 9.

Flapping the wings when moving downwards and forwards meets increased air resistance and then rods 44 additionally bend and rotate about their axes to create a flatter side for feather-like panels 45. At the same time the edges of the feather-like panels 45 elastically bend and deform in the air intervals as depicted in FIG. 7, cross-section CC. As a consequence of these deformations, the aerodynamic lifting and propulsion forces, additionally increase. During this movement, the feather-like panels 45 in cross-section BB form the solid aerodynamic profile depicted in FIG. 6. The greater aerodynamic forties generated when a wing moves upwards and backwards push harder on the flatter side of asymmetrical panels 45. These forces, by rotating panels 45 and rods 44, at the same time rotate cranks 46 attached to them, the uniform and equal rotation of which is ensured by parallel links 47, 48, 49 moving together with them. In moving, parallel link 48 stretches spring 52 and stops when support 50, which is attached to it, comes to rest on immobile support 51. The movements up to support 51 occur when the ornithopter's horizontal speed is small or zero at the beginning of an ascent. At that moment rotatable panels 45 occupy the position depicted in FIG. 8 and create the aerodynamic forces P and T depicted in FIG. 10. After the ornithopter reaches horizontal speed $V_H$, the feather-like panels 45 rotate to the acuter angle depicted in FIG. 9 and then create smaller aerodynamic forces (FIG. 11). It also depicts vector $V_H$ for the ornithopter-sailplane's speed, vector $V_S$ for the speed of a flapping wing's movement in the space, and vector $V_{HS}$ for its horizontal projection. It is evident that when the ornithopter reaches horizontal flying speed $V_H \geq V_S$, feather-like panels 45 can no longer rotate in moving the wing upwards and backwards. After the ordinary upwards and backwards movement of the flapping wing ends, the aerodynamic forces that affected panels 45 fall to zero and then spring 52 returns the entire mechanism and feather-like panels 45 to the initial closed position depicted in FIG. 6.

When a pilot begin to fly, by using sharp movements of femoral arms 3 he can develop aerodynamic forces increased by the flapping wings (see FIG. 10) by synchronically bending his torso and humeral arms 23, 24 forward.

An ornithopter-sailplane can be used in flying sports, recreation, and leisure time.

What is claimed is:

1. A man-powered ornithopter-sailplane with a muscular propulsion engine, which is connected through a kinematic chain to one or two pairs of flapping wings, and characterized in that posterior wing axle ball joints (15,16) of horizontally inclined wing axles (13,14) for the flapping wings are directly connected to posterior upper corners of a frame, which comprises of strips (8,9,10,12) and is attached to a torso base (1) for a femoral propulsion engine, and in that aft of posterior wing axle ball joints (15,16) are wing axle brackets (30,31), which comprise an extension of wing axles (13,14), between ends of which wing axle brackets (30,31) is stretched cord (32), a counterbalance of which comprises of a cord (33) stretched between mobily attached anterior wing axle ball joints (17,18) of wing axles (13,14), which joints receive guiding movements through wing axle ball joint to shoulder ball joint intermediate links (19,20) and shoulder ball joints (21,22) from humeral arms (23,24) of a humeral propulsion engine, arms of which are firmly attached with elastic straps (28,25,26) respectively to upper arms, between themselves, and to a shoulder base (7), which last is joined by sliding torso ball joint (6) to said torso base (1), which is attached by joints (5) to femoral arms (3), which are directly joined kinematically through femoral arm attached ball joints (34,35), femoral arm attached ball joint to wing arm ball joint intermediate links (36,37), wing arm ball joints (38,39), and wing arms (40,41) to flapping wing panels (42,43) as well as to rotatable stiff rods (44) mounted in them and stiff aerodynamic feather-like panels (45), which are attached to the rods asymmetrically to rods' axes and which form the general effective aerodynamic profile of the middle and end of the flapping wing.

2. A man-powered ornithopter-sailpane in accordance with claim 1, further comprising a glider ball joint (11), which is connected to the anterior part of the frame, which comprises of strips (8, 9, 10, 12) attached to the torso base (1) for the femoral propulsion engine, to which said glider ball joint (11) is attached a hang glider wing (53) and a guiding trapezium (54).

3. A man-powered ornithopter-sailplane in accordance with claim 2, wherein said anterior wine posterior wine axle ball joints (57,58) of mobily attached anterior wing axles (55,56) for the anterior pair of flapping wings are directly attached to the posterior part of the frame, which comprises of said strips (8,9,10,12) attached to said torso base (1) for the femoral propulsion engine, and aft of said anterior wine posterior wing axle ball joints (57,58) are said anterior wing axle brackets (101,102), which comprise an extension of said mobily attached anterior wing axles (55,56), between the ends of which said anterior wing axle brackets (101,102) is stretched cord (103), the counterbalance of which comprises of cord (104) stretched between anterior wing wing axle ball joints (71,72) of said mobily attached anterior wing axles (55,56), and in that said frame posterior corner attached anterior ball joints (61,62) of mobily attached posterior flapping wing axles (59,60) for the posterior pair of flapping wings are directly attached to the posterior superior corner of the frame and in front of said frame posterior corner attached anterior ball joints (61,62) are posterior wine axle brackets (105,106), which comprise an extension of said posterior flapping wing axles (59,60), between the ends of which said posterior wing axle brackets (105,106) is stretched cord (107), the counterbalance of which comprises of cord (108) stretched between said posterior wing wing axle ball joints (77,78) of said mobily attached posterior flapping wing axles (59,60), to which said posterior wing wing axle ball joints (77,78) are kinematically connected said posterior wing intermediate links (75,76), said respective intermediate link-joining ball joints (73,74), and said posterior wing intermediate links (65,66), which are attached to the frame by said strip sliding ball joints (63,64) and joined at the opposite end through said posterior wing ball joints (67,68) to said shoulder intermediate links (69,70), which are joined at their superior ends to said anterior wing wing axle ball joints (71,72) of said mobily attached anterior wing axles (55,56) for the anterior pair of wings and at the inferior ends to said shoulder ball joints (21,22), which are attached to said humeral arms (23,24), which are firmly attached with elastic straps said (28,25,26) respectively to the upper arms, between themselves, and to the shoulder base (7), which last is attached by sliding ball joint (6) to the torso base (1), which is attached by said joints (5) to said femoral arms (3), which are directly joined kinematically through said femoral arm attached ball joints (34, 35), said femoral intermediate links (79,80), said intermediate joints (81,82,91,92), said anterior wing intermediate links (83,84,93,94), and said flapping wing arm ball joints (85,86, 95,96) to anterior and posterior flapping wing arms (87,88, 97,98), to which are rigidly attached anterior and posterior wing panels (89,90,99,100), in which are mounted said rotatable stiff rods (44), to which are attached, asymmetrically to the rods' axes, the stiff aerodynamic feather-like panels (45), which form the general aerodynamic profile of the middle and ends of the flapping wings.

4. A man-powered ornithopter-sailplane in accordance with claim 2, wherein said stiff rotatable rods (44) are mounted in flapping wing panels (42,43,89,90,99,100), to the ends of which rods are attached cranks (46), which are collectively joined in kinematic pairs by parallel links (47,48, 49), and in that to said parallel link (48) is rigidly attached mobile support (50), resting at the end of the movement of said parallel link (48) on immobile support (51) which is attached to the construction of said wing panels (42,43,89,90, 99,100), to which construction is also attached the end of spring (52), the other end of which is attached to said parallel link (48) and its tension force rotates said stiff rotatable rods (44) and the stiff aerodynamic feather-like panels (45) attached to them to the initial shut position, in which these panels, being narrower at the wing's end, create a broken aerodynamic profile having intervals that narrow between the adjacent stiff aerodynamic feather-like panels (45) and are wider in the middle part of the wing to create a solid aerodynamic profile, which becomes a composite wing profile formed from a row of separate stiff aerodynamic feather-like panels (45) after these panels rotate during the wing's upwards-backwards motion.

5. A man-powered ornithopter-sailpiane in accordance with claim 1, wherein anterior wing posterior wing axle ball joints (57, 58) of anterior wing axles (55, 56) for the anterior pair of flapping wings are directly attached to the posterior part of the frame, which comprises of said strips (8, 9, 10, 12) attached to said torso base (1) for the femoral propulsion engine, and aft of anterior wing posterior wing axle ball joints (57,58) are anterior wing axle brackets (101,102), which comprise an extension of anterior wing axles (55,56), between the ends of which said anterior wing axle brackets (101,102) is stretched cord (103), the counterbalance of which comprises of cord (104) stretched between anterior wing wing axle ball joints (71,72) of mobily attached anterior wing axles (55,56), and in that frame posterior corner attached anterior ball joints (61,62) of mobily attached posterior flapping wing axles (59,60) for the posterior pair of flapping wings are directly attached to a posterior superior corner of the frame and in front of said frame posterior corner attached anterior ball joints (61,62) are posterior wing axle brackets (105,106), which comprise an extension of said posterior flapping wing axles (59,60), between the ends of which posterior wing axle brackets (105,106) is stretched cord (107), the counterbalance of which comprises of cord (108) stretched between posterior wing wing axle ball joints (77,78) of mobily attached posterior flapping wing axles (59,60), to which posterior wing wing axle ball joints (77,78) are kinematically connected to posterior wing intermediate links (75, 76), an opposite end of said posterior wing intermediate links (75,76) being connected to respective intermediate link-joining ball joints (73,74), and posterior wing intermediate links (65,66), which are attached to the frame by strip sliding ball joints (63,64) and joined at the opposite end through posterior wing ball joints (67,68) to shoulder intermediate links (69, 70), which are joined at their superior ends to anterior wing wing axle ball joints (71,72) of said mobily attached anterior wing axles (55,56) for the anterior pair of wings and at the inferior ends to said shoulder ball joints (21,22), which are attached to said humeral arms (23,24), which are firmly attached with elastic straps said (28,25,26) respectively to the upper arms, between themselves, and to the shoulder base (7), which last is attached by sliding torso ball joint (6) to the torso base (1), which is attached by said joints (5) to said femoral arms (3), which are directly joined kinematically through said femoral arm attached ball joints (34,35), femoral intermediate links (79,80), intermediate joints (81,82,91,92), anterior wing intermediate links (83,84,93,94), and flapping wing arm ball joints (85,86,95,96) to anterior and posterior flapping wing arms (87,88,97,98), to which are rigidly attached anterior and posterior wing panels (89,90,99,100), in which are mounted said rotatable stiff rods (44), to which are attached, asymmetrically to the rods' axes, the stiff aerodynamic feather-like panels (45), which form the general aerodynamic profile of the middle and ends of the flapping wings.

6. A man-powered ornithopter-sailplane in accordance with claim 5, wherein said stiff rotatable rods (44) are mounted in flapping wing panels (42,43,89,90,99,100), to the ends of which rods are attached cranks (46), which are collectively joined in kinematic pairs by parallel links (47,48, 49), and in that to said parallel link (48) is rigidly attached mobile support (50), resting at the end of the movement of said parallel link (48) on immobile support (51) which is attached to the construction of said wing panels (42,43,89,90, 99,100), to which construction is also attached the end of spring (52), the other end of which is attached to said parallel link (48) and its tension force rotates said stiff rotatable rods (44) and the stiff aerodynamic feather-like panels (45) attached to them to the initial shut position, in which these panels, being narrower at the wing's end, create a broken aerodynamic profile having intervals that narrow between the adjacent stiff aerodynamic feather-like panels (45) and are wider in the middle part of the wing to create a solid aerodynamic profile, which becomes a composite wing profile formed from a row of separate stiff aerodynamic feather-like panels (45) after these panels rotate during the wing's upwards-backwards motion.

7. A man-powered ornithopter-sailplane in accordance with claim 1, wherein said stiff rotatable rods (44) are mounted in flapping wing panels (42,43,89,90,99,100), to the ends of which rods are attached cranks (46), which are collectively joined in kinematic pairs by parallel links (47,48, 49), and in that to said parallel link (48) is rigidly attached mobile support (50), resting at the end of the movement of said parallel link (48) on immobile support (51) which is attached to the construction of said wing panels (42,43,89,90, 99,100), to which construction is also attached the end of spring (52), the other end of which is attached to said parallel link (48) and its tension force rotates said rotatable stiff rods (44) and the stiff aerodynamic feather-like panels (45) attached to them to the initial shut position, in which these panels, being narrower at the wing's end, create a broken aerodynamic profile having intervals that narrow between the adjacent feather-like panels (45) and are wider in the middle part of the wing to create a solid aerodynamic profile, which becomes a composite wing profile formed from a row of separate stiff aerodynamic feather-like panels (45) after these panels rotate during the wing's upwards-backwards motion.

* * * * *